United States Patent
Bae

(10) Patent No.: US 6,950,820 B2
(45) Date of Patent: Sep. 27, 2005

(54) MAINTAINING CONSISTENCY OF A GLOBAL RESOURCE IN A DISTRIBUTED PEER PROCESS ENVIRONMENT

(75) Inventor: Myung M. Bae, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 576 days.

(21) Appl. No.: 09/791,281

(22) Filed: Feb. 23, 2001

(65) Prior Publication Data

US 2002/0120597 A1 Aug. 29, 2002

(51) Int. Cl.⁷ ............................................. G06F 17/30
(52) U.S. Cl. ................ 707/10; 707/7; 707/8; 707/9; 709/212; 709/213
(58) Field of Search .................. 707/1–10, 100–104.1, 707/200–206; 709/210–219

(56) References Cited

U.S. PATENT DOCUMENTS

| | | | |
|---|---|---|---|
| 5,623,655 A | * 4/1997 | Chisaka | 707/8 |
| 5,649,195 A | * 7/1997 | Scott et al. | 707/201 |
| 5,768,538 A | 6/1998 | Badovinatz et al. | 709/248 |
| 5,790,772 A | 8/1998 | Badovinatz et al. | 709/106 |
| 5,799,146 A | 8/1998 | Badovinatz et al. | 709/106 |
| 5,826,253 A | 10/1998 | Bredenberg | 707/2 |
| 5,845,082 A | 12/1998 | Murakami | 709/226 |
| 5,893,116 A | 4/1999 | Simmonds et al. | 707/201 |
| 5,933,604 A | 8/1999 | Inakoshi | 709/226 |
| 5,978,842 A | 11/1999 | Noble et al. | 709/218 |
| 5,991,821 A | 11/1999 | Badovinatz et al. | 709/300 |
| 5,999,947 A | 12/1999 | Zollinger et al. | 707/203 |
| 6,016,505 A | 1/2000 | Badovinatz et al. | 709/205 |
| 6,026,426 A | 2/2000 | Badovinatz et al. | 709/106 |
| 6,061,686 A | 5/2000 | Gauvin et al. | 707/10 |
| 6,070,189 A | 5/2000 | Bender et al. | 709/224 |
| 6,098,078 A | * 8/2000 | Gehani et al. | 707/203 |
| 6,411,967 B1 | * 6/2002 | Van Renesse | 707/201 |
| 6,574,674 B1 | * 6/2003 | May et al. | 709/313 |

OTHER PUBLICATIONS

Kuo et al., "Fixed–Priority–Driven Open Environment for Real–Time Applications, " IEEE Real–Time Systems Symposium, 20th, Phoenix, Dec. 1–3, 1999, pp. 255–267.

"Network Selective Resource and Status Information Distribution," IBM Technical Disclosure Bulletin, Sep., 1991, pp. 377–379.

Shaheen, Chao Hough Inventors, Pending U.S. Appl. No. 09/282,908 filed Mar. 31,1999.

* cited by examiner

*Primary Examiner*—John E. Breene
*Assistant Examiner*—Isaac M. Woo
(74) *Attorney, Agent, or Firm*—Lawrence D. Cutter

(57) ABSTRACT

In a distributed peer-to-peer data processing system, consistency and access to a global resource maintained on one of the nodes is provided through the use of global incarnation numbers, local incarnation numbers, and proposed incarnation numbers. Internode traffic is kept to a minimum while still maintaining consistency. The system and method of the present invention are particularly useful at start-up and data change processing points in time.

10 Claims, 2 Drawing Sheets

MAINTAINING CONSISTENCY OF A GLOBAL RESOURCE IN A DISTRIBUTED PEER PROCESS ENVIRONMENT

BACKGROUND OF THE INVENTION

The present invention is generally directed to a method for controlling access to globally available data which resides on one node of a multiprocessor system so as to maintain consistency in a distributed peer to peer data processing system group. More particularly, the present invention is directed to a method and system for maintaining consistency of data without sacrificing access optimality and a loss of efficiency.

The present invention is employed in a distributed data processing system in which there are a plurality of separate and independent processor nodes each running their own set of local processes. In the systems of the present invention one or more of these nodes includes a global resource such as configuration data which must be accessed from and by other processes running in the other nodes in a group. In particular, when the global resource is changed, consistency problems can arise. Additionally, when a processor enters or leaves the group and/or when group start-up is initiated or reconfigured, consistency problems can also arise. It is difficult not only to notify all peer processes about changes in a global resource (such as its content) in a synchronized manner such that different resource content is used among the peer processes, but it is also especially difficult to optimize access to the global resource in terms of minimizing the number of accesses to needed global data. In many cases, if a few peer processes miss the notification of the changes, or receive the notifications asynchronously as is often the case, overall coordination between peer processes may fail or may cause unexpected results.

There are several situations in which the inconsistency problem is significant. For example, a global resource may be located on a processor node which is accessed from many other nodes at the same time. As indicated above, it is not easy to achieve notification to all distributed peer processes running on multiple nodes in a synchronized manner whenever the global resource is changed. Also, if global resource utilization is not optimized and multiple peer processes start up at almost the same time, the node which has the global resource can become a performance bottleneck because all of the processes may attempt to access this resource at the same time.

Additionally, if there is no automatic mechanism which allows the peer processes to use the same global resource, there is always a chance for inconsistent use of the global resource between the peer processes. As a simple example of this situation, it may happen that if one of the peer processes does not receive notification of the change of the global resource, consistency is almost always lost. Lastly, if global resources change while a peer process is temporarily isolated, it is not easy for the peer process to obtain a current level of information relating to the global resource when isolation is removed.

In distributed processing environments of the kind considered herein, it is noted that there are a plurality of data processing nodes employed. Some of these nodes may in fact be physically and/or geographically remote. It is often noted that this environment includes local processes that are running on individual ones of the nodes and that these nodes may from time to time enter or drop out of an unspecified data processing group. Additionally, it is possible that nodes may fail and/or that communications to a particular node may be lost. In these situations, appropriate protocols and communications are of particular import when the nodes are accessing data of a global nature which is maintained as such on only one of the nodes. In order that access to the global version of the data is not being performed required at all times, the nodes individually maintain local copies of the global resource. This is particularly important in those situations in which the global resource represents configuration data for the group.

It is important for applications (processes running on local nodes) to have a mechanism for notifying all of the other peer processes on the other nodes that changes associated with the global resource have been made. This notification should be made in a synchronized manner as well as providing a mechanism for the automatic propagation of the changes. This notification is provided between the various peer processes running on the local nodes. These processes should execute in an environment in which there is an infrastructure which provides synchronization and automatic propogation of the changes of the global resource. However, it is difficult to create this infrastructure particularly if the processes are left on their own to create it. This situation could run the risk of repeating errors and increases the risk of loss of data consistency among the nodes. Accordingly, the present invention provides infrastructure support which is available to all processes running and associated with a group of nodes or processes.

SUMMARY OF THE INVENTION

In accordance with a preferred embodiment of the invention, a method is provided for controlling access to data, which resides on one node, from a plurality of nodes which are coupled together as a distributed peer to peer data processing system. In particular, a global incarnation number is assigned to the global resource data. This number is accessible to processes running on other nodes. A separate local incarnation number is assigned to versions of this data present on individual nodes within the group. When a local process running on a node within the group wishes to change the data in the global resource, a change notification is provided to the other nodes. These other nodes compare their own local incarnation numbers with the global incarnation number received in the change notification. Based upon this comparison, a proposed new incarnation number is provided to at least one other node in the group, and preferably to all of the nodes in the group. At least one of these nodes determines, based upon a comparison of the global incarnation number with the proposed incarnation number, whether or not to update the local version of the data using the global resource.

This mechanism provides a number of significant advantages. First of all, global resource data consistency is maintained. Furthermore, the use of the global resource is optimized and needless access to it is eliminated. Additionally, the present invention avoids the problem associated with other mechanisms in that previously isolated peer processes may have missed a notification of a change may still use the old content of the global resource while other peer processes used the newer contents.

The infrastructure proposed in accordance with the present invention provides a mechanism for guaranteeing synchronous notification between peer processes and for eliminating these problems. These processes are connected to one another through an application program interface (API) which provides consistent notification whenever the content of the global resource changes. This notification contains an indication of the currency of the global resource, that is its incarnation number, which is currently used by the sending peer process. Additionally, consistent notification of incarnation number is sent to the processes whenever the content of global resource is changed as well as when each peer process is initiated. Each peer process also preferably holds a local persistent copy of the global resource and its incarnation number so that the number of accesses to the global resource is minimized.

Accordingly, users of the present invention have the following advantages. Through utilization of consistent notification of the incarnation number applications (local processes) are always able to maintain data consistency in the use of the global resource between multiple peer processes in a distributed environment. If a change to the global resource is made, in accordance with the infrastructure provided herein, all peer processes are automatically notified so that they can reincorporate the global resource in a synchronized manner, if necessary or if desired. Additionally, the number of accesses to the global resource is minimized by maintaining a local copy of the global resource and through the use of a monotonically increasing (or decreasing if desired) incarnation number. Furthermore, the system of processes is easily structured through the use of easy to use APIs while still achieving consistency in global resource utilization. Each peer process is also able to consistently keep track of the membership of the other peer processes in the group.

Accordingly, it is an object of the present invention to provide consistent utilization of a global resource residing on one node of a distributed peer-to-peer data processing system.

It is also an object of the present invention to minimize the number of accesses or references to a global resource.

It is still a further object of the present invention to guarantee synchronous notification between peer processes and a distributed network.

It is yet another object of the present invention to provide applications and processes with the ability to easily interact through an application programming interface (API).

It is also an object of the present invention to provide the capability for local processes and individual nodes to maintain their own copies of global data so as to minimize the number of accesses that have to be made to this data using internode communications.

It is also an object of the present invention to permit local processes to decide whether or not their own local data versions should be or are required to be updated, with this decision being made within the individual nodes by the various processes themselves.

It is a still further object of the present invention to enhance the capabilities of interconnected data processing nodes with respect to their existence as a member of a group of processes carrying out a distributed operation.

It is yet even another object of the present invention to protect against that circumstance in which an isolated peer process has missed a notification of change in the global resource.

It is still a further object of the present invention to improve the startup operations associated with bringing together a group of processes running on individual nodes so as to perform a unified operation in a distributed data processing system.

It is also an object of the present invention to provide an optimized and efficient mechanism for accessing data which needs to be accessed by plurality of processes running in a distributed processing environment.

Lastly, but not limited, it is an object of the present invention to ensure data consistency in a distributed peer to peer data processing environment.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION OF THE INVENTION

Figure 1:
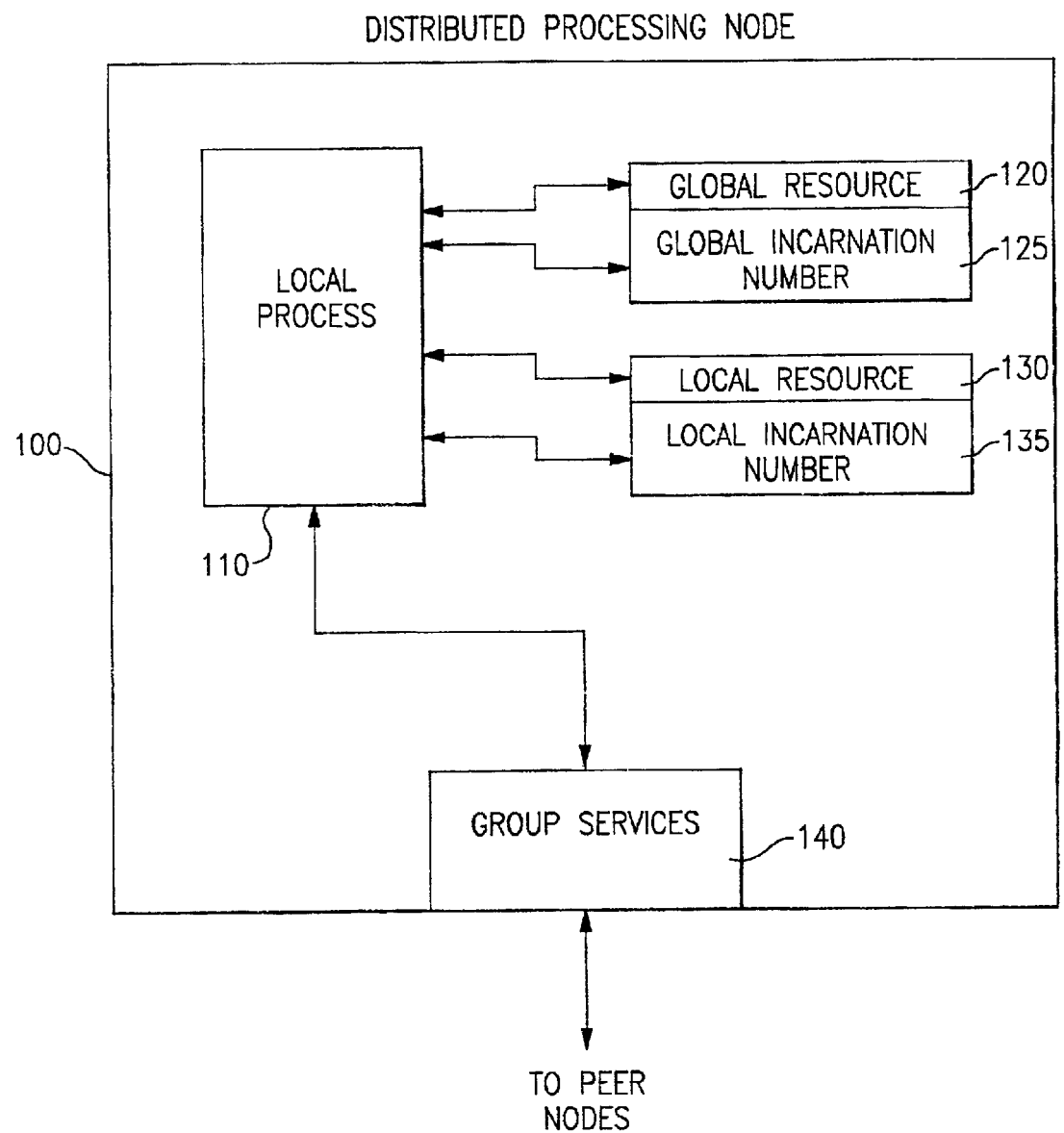
FIG. 1 is a block diagram illustrating in detail the organization of processes and resources in an individual distributed processing node.
Figure 2:
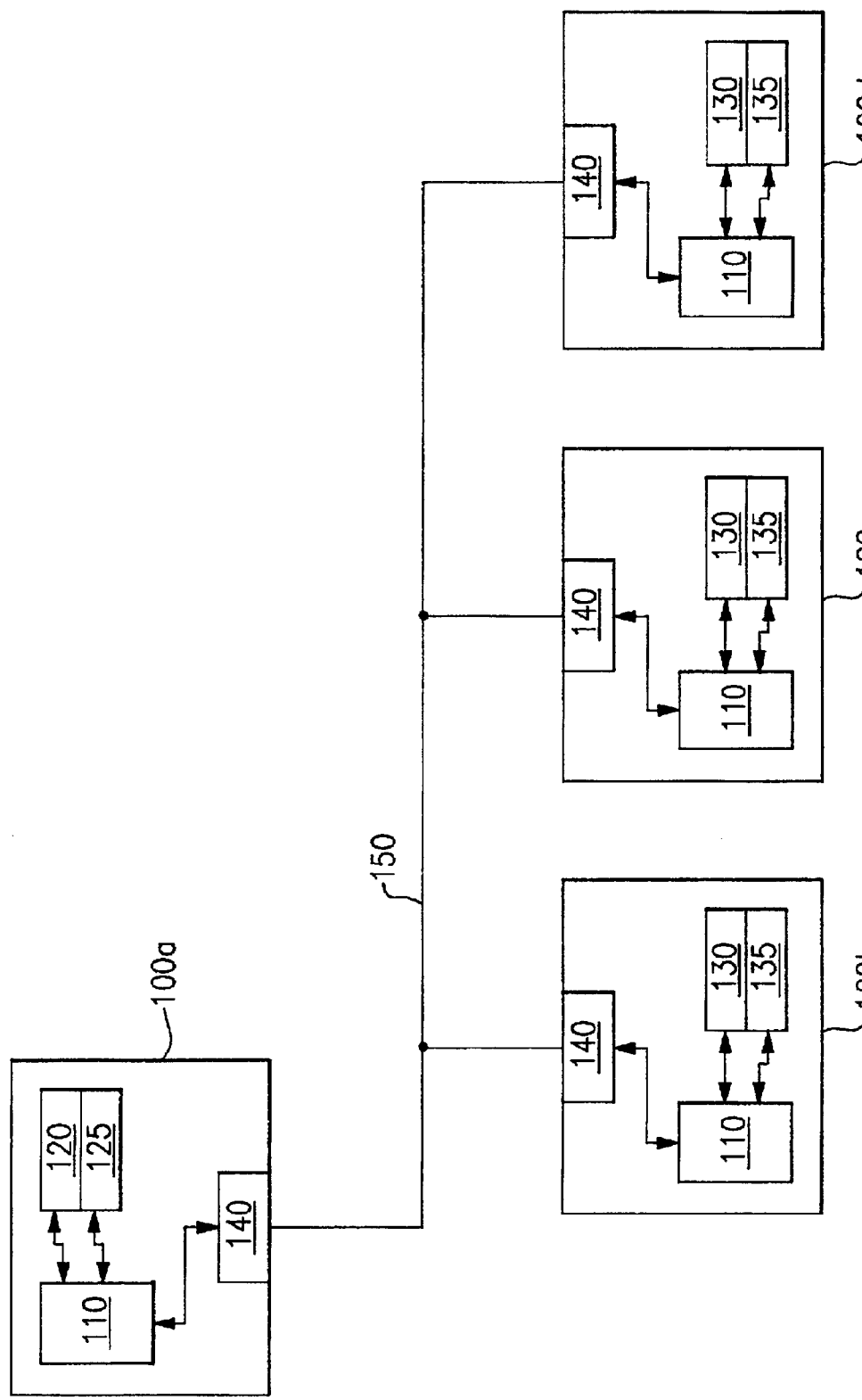
FIG. 2 is a block diagram similar to that shown in FIG. 1 except that it more particularly illustrates the interconnection of the distributed processing nodes.

In order to best understand the structure and operation of the present invention, attention is directed to FIGS. 1 and 2. In particular, FIG. 1 illustrates the structure and relationship amongst various components operating within a single node of a distributed processing system. FIG. 2 illustrates how these nodes are connected in a network. In particular, it is seen in FIG. 1 that node 100 includes local process 110 that is running on that data processing node. In accordance with the present invention, local process 110 communicates with other nodes in the group through Group Services API 140. One embodiment of Group Services function 140 is described in U.S. Pat. No. 6,026,426 issued Feb. 15, 2000, and assigned to the same assignee as the present invention. Accordingly, the contents of this patent are incorporated herein by reference in support of a description of the Group Services API functions.

In accordance with the present invention, FIG. 1 also illustrates that global resource 120 is associated with global incarnation number 125. Local process 110 also typically has access to local resource 130 which is associated with local incarnation number 135. While FIG. 1 illustrates both of these resources (120 and 130) within a single node of a distributed processing system group, within any given node local resource 130 is not likely to be specifically associated with the global resource also contained within that node. However, it is shown as being present in this particular node solely for purposes of illustrating a more generic case. In general, for purposes of understanding the structure and operation of the present invention, global resource 120 is present on a single node with local versions of this global resource stored on other nodes. However, it is to be specifically noted that the present invention is not in anyway limited to situations in which local process 110 is associated only with a single global resource. In full generality, local process 110 may employ and be linked to a number of different global resources for similar or different purposes.

Likewise, node 100 is not limited to the running of only a single local process.

FIG. 2 illustrates the interconnection of a number of distributed processing nodes (100a through 100d) which are interconnected embodiment of the invention, connection 150 represents a switch across which messages are sent from one node to another node. For purposes of communicating the information herein relating to global, local and proposed incarnation numbers, this communication is preferably performed through utilization of Group Services API 140.

The operation of the present invention is now more particularly described. The program code of the present invention creates and maintains certain entities for use in the described method. In particular, global incarnation number 125 is associated with global resource 120. This number is monotonically increased (or decreased if so desired, as long as monotonicity is preserved) and is changed whenever global resource 120 changes. Global incarnation number 125 is preferably stored on a persistent storage medium along with the global resource. However, it is noted that the present invention is not limited to the storage of either global resource 120 or global incarnation number 125 on a persistent medium such as a hard drive or direct access storage device. In certain circumstances, particularly, when global resource 120 is relatively small in size. Comparing resources (global verses local) can also sometimes be used as a mechanism for determining the newer version when resource size is small.

The utilization of Group Services 140 provides a mechanism which permits a number of data processing nodes in a network system to join a group and/or to leave the group. Moreover, Global Services 140 also provides a mechanism for node exit in the event of node and or communication failure. Accordingly, Group Services 140 maintains a membership list of peer processes and also maintains a consistent state value and is responsible for communicating a proposed incarnation number using state change protocols between peer processes. In another aspect of the operation of the present invention, a local copy of the global resource (local resource) and a local copy of the global incarnation number (that is, the local incarnation number) is maintained on a (preferably) persistent storage device for each peer process.

There are three circumstances in which the operation of the present invention provides advantages. First, when a peer process starts up, the process of the present invention establishes mechanisms for consistency preservation. Secondly, when a global resource is changed, consistency is maintained via the communication of proposed incarnation numbers to the peer processes running within the group of nodes. Lastly, consistency is maintained when a peer process either stops or otherwise fails. These three modes of operation of the present invention are now more specifically considered.

First is discussed, the peer start up process operation. In particular, when a peer process begins, Group Services 140 is employed to provide notification of membership change with respect to the group members, as described in the above mentioned U.S. Pat. No. 6,026,426. When join approval notification is provided, the already joined processes do not have to perform any special functions. However, the joining peer process carries out the following operations. In particular, the joining process obtains the group state value referred to herein as group incarnation number 120 as a result of the join approval notification process. Each of the peer processes receives consistent notification of the approval of the joining of the operation. This guarantees that Group Services function as described in U.S. Pat. Nos. 5,799,146 and 5,768,538. These patents are also incorporated herein by reference. Next, the joining process determines local incarnation number 130 from its (preferably) persistent storage medium. If no such number is present or if the number is smaller than the received incarnation number, that is, smaller than the proposed incarnation number received upon joining, the global resource is accessed and stored locally. Thus at the end of the peer start up process, the local process has available to it a consistent and accurate local copy of the global resource and has associated that copy with a local incarnation number, which, at this point in time, is the same as the proposed incarnation number which was provided as a result of the joining process. At this point, operation of local process 110 is begun.

Next is considered the situation in which the global resource is changed. When global incarnation number 125 is increased, notification is sent to the other peer processes. This may be sent as a reconfiguration request. When a peer process receives a change notification from another node, the peer process accesses global incarnation number 125 via the Global Services API and compares it with local incarnation number 135. Alternatively, the global resource and local resource may be compared if there is no global incarnation number. If global incarnation number 125 is smaller or the same as that of local incarnation number 135, then the change notification is ignored. Otherwise, an n-phase state change protocol is initiated using global incarnation number 125 which is communicated to other members of the group. In the first phase of the notification of the state change protocol, as described in U.S. Pat. Nos. 6,026,426 and 5,768,538 referred to above, each peer process receives the new incarnation number and compares it with its own local incarnation number. If the proposed incarnation number is less than or equal to the local incarnation number, the peer process sends approval to the Group Services protocol and is required to take no further action. Otherwise, the peer process accesses the global resource and saves it to the local storage and sends notification of the approval. Upon approval notification, each peer process incorporates the newly accessed global resource, or does nothing if no global resource was accessed.

Next is considered the situation when a local peer process either fails or otherwise comes to a normal end. In this situation, group services 140 automatically initiates a failure protocol with respect to the failed or stopped process. Otherwise, there is no need for special action or operations to be performed by other processes in the group.

Using the above described protocol and methods, a distributed peer-to-peer data processing system with separate processes running on its nodes is provided with a number of advantages. For example, all of the peer processes are guaranteed to received a consistent incarnation number and to thus preserve consistent use of the global resource. Furthermore, all of the peer processes are guaranteed to access the global resource only once whenever it changes. This minimizes the number of accesses to the global resource and, therefore, it enhances overall system performance. The present method also automatically propagates change notification with respect to the global resource to all peer processes and thus eliminates all consistency concerns particularly those dealing with reconfiguration. And lastly, it is noted that the protocol and method is readily implemented using existing Group Services interface.

With respect to the present system and protocol, it is also noted that data changes are proposed. They are not automatic. Accordingly, this provides a mechanism for a certain amount of decision making and autonomy present in local processes. This autonomy may be taken advantage of to any desired degree. In particular, it is noted that the results of comparing local incarnation numbers with proposed incarnation numbers can result in operations being performed by the local process other than those necessarily related to the global resource. Furthermore, it is noted that the present invention provides a mechanism for indicating via the communication linkage provided by Group Services a detailed description of the nature and extent of the change made to the global resource. In particular, it is noted that particularly for larged sized global resources, transmission of the entire set of data is not necessary. It is noted that local processes can take advantage of their decision making authority in regard to the specific changes made in the global resource.

From the above, it should be appreciated that the objects of the present invention are accomplished by various embodiments of the system and method described herein. In particular, it is seen that consistency of global resource data is maintained across a plurality of distributed nodes in a peer-to-peer manner in a defined node group. It is also seen that transmission of data across network connection 150 is also kept to a minimum in the systems of the present invention while at the same time still maintaining the desired consistency.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for controlling access to data, residing on one node, from a plurality of nodes which are coupled together as a distributed peer-to-peer data processing system group, said method comprising the steps of:
   assigning to said data a global incarnation number which is accessible to processes running on said nodes;
   assigning to local versions of said data within individual nodes a local incarnation number;
   providing to nodes within said group a change notification regarding said data;
   comparing, within at least one of said nodes in said group upon receipt of said change notification, said global incarnation number with the local incarnation number;
   based upon said comparison, providing, to at least one node in said group, a proposed incarnation number; and
   determining, for at least one node in said group, whether to update the local version of said data within said node based upon a comparison of said global incarnation number with said proposed incarnation number.

2. The method of claim 1 in which said proposed incarnation number is provided to all of the nodes within said group.

3. The method of claim 1 in which said local incarnation number, said global incarnation number and said proposed incarnation number are updated in a monotonically increasing fashion.

4. The method of claim 1 in which said local incarnation number, said global incarnation number and said proposed incarnation number are updated in a monotonically decreasing fashion.

5. The method of claim 1 in which said determining step is carried out for all of the nodes within the group.

6. The method of claim 1 in which said determining step is carried out by said processes running on said nodes.

7. A method for controlling access to data, residing on one node, from a plurality of nodes which are coupled together as a distributed peer-to-peer data processing system group, said method comprising the steps of:
   assigning to said data a global incarnation number which is accessible to processes running on said nodes;
   assigning to local versions of said data within individual nodes a local incarnation number;
   providing notification to nodes within said group that a new node has joined the group and is requesting access to said data;
   comparing, within said new node in said group upon receipt of said notification of joining approval, said global incarnation number with a local incarnation number;
   based upon said comparison, providing to said new node in said group, a proposed incarnation number; and
   determining for said new node, whether to update the local version of said data within said node, based upon a comparison of said global incarnation number with said proposed incarnation number.

8. The method of claim 1 in which said local incarnation number, said global incarnation number and said proposed incarnation number are updated in a monotonically increasing fashion.

9. The method of claim 1 in which said local incarnation number, said global incarnation number and said proposed incarnation number are updated in a monotonically decreasing fashion.

10. A data processing system comprising:
    a plurality of processor nodes each of which includes a processor and memory, said nodes having a network interconnection for sending data and messages between any one and another of said plurality of nodes;
    global information stored on any one of said nodes for access and use by other ones of said nodes through said network interconnection, said global information being associated with a global incarnation number;
    local information, representing versions of said global information, stored in the memories of said other nodes in said system, said local information being associated with a local incarnation number;
    first program means residing in said nodes, for notifying, via said network interconnection, other nodes that said global information has changed, and providing with said notification, said global incarnation number;
    second program means residing in said nodes, for comparing said received global incarnation number with said local incarnation number;
    third program means residing in said nodes, for providing via said network interconnection, based upon said comparison, a proposed incarnation number for said global information; and
    fourth program means residing in said nodes, for determining whether to update local versions of said information based upon comparison of said global incarnation number with said proposed incarnation number.

* * * * *